United States Patent [19]

Parulski et al.

[11] Patent Number: 5,668,597
[45] Date of Patent: Sep. 16, 1997

[54] ELECTRONIC CAMERA WITH RAPID AUTOMATIC FOCUS OF AN IMAGE UPON A PROGRESSIVE SCAN IMAGE SENSOR

[75] Inventors: Kenneth A. Parulski, Rochester, N.Y.; Masaki Izumi, Yokohama, Japan; Seiichi Mizukoshi, Chigasaki, Japan; Nobuyuki Mori, Setagaya-ku, Japan

[73] Assignee: Eastman Kodak Company, Rochester, N.Y.

[21] Appl. No.: 367,404

[22] Filed: Dec. 30, 1994

[51] Int. Cl.$^6$ ............................................ H04N 5/232
[52] U.S. Cl. .......................... 348/350; 348/315; 348/353
[58] Field of Search .................................. 348/311, 312, 348/314, 315, 316, 317, 322, 323, 345, 349, 350, 362, 363, 364; 354/400, 402, 403; H04N 5/232

[56] References Cited

U.S. PATENT DOCUMENTS

| | | | |
|---|---|---|---|
| 4,047,187 | 9/1977 | Mashimo et al. | 354/23 |
| 4,614,975 | 9/1986 | Kaite | 358/227 |
| 4,752,831 | 6/1988 | Biber et al. | 358/227 |
| 4,876,608 | 10/1989 | Eaton | 358/443 |
| 4,974,092 | 11/1990 | Kawamura et al. | 358/227 |
| 5,051,833 | 9/1991 | Tsuji | 358/227 |
| 5,164,756 | 11/1992 | Hirasawa | 354/400 |
| 5,182,649 | 1/1993 | Miyazaki | 358/227 |
| 5,196,939 | 3/1993 | Elabbl et al. | 358/213.11 |
| 5,233,431 | 8/1993 | Yoshida et al. | 358/227 |
| 5,347,371 | 9/1994 | Nishimura et al. | 358/453 |
| 5,363,137 | 11/1994 | Suga et al. | 348/302 |
| 5,394,187 | 2/1995 | Shipp | 348/269 |
| 5,432,331 | 7/1995 | Wertheimer | 250/201.7 |
| 5,452,004 | 9/1995 | Roberts | 348/301 |
| 5,563,658 | 10/1996 | Parulski et al. | 348/350 |

FOREIGN PATENT DOCUMENTS

| | | | |
|---|---|---|---|
| 0 399 232 A2 | 4/1990 | European Pat. Off. | H04N 5/232 |
| 0 421 243 A2 | 9/1990 | European Pat. Off. | H04N 5/232 |
| 62-094084 | 4/1987 | Japan | H04N 5/335 |
| 1303975 | 12/1989 | Japan | H04N 5/335 |

OTHER PUBLICATIONS

"KAI-0310 648(H)×484(V) Pixel Interline CCD Image Sensor Performance Specification", Eastman Kodak Company, Revised Apr. 26, 1994.

Primary Examiner—Thai Tran
Assistant Examiner—Ngoc-Yen Vu
Attorney, Agent, or Firm—David M. Woods

[57] ABSTRACT

A technique for automatically focusing the lens of an electronic still camera employs a progressive scan image sensor 20 with a fast dump structure 62. The image sensor 20 itself is operated first in a "fast flush" mode to focus a lens 22, and then in a normal readout mode to obtain the final still image. To focus the lens 22, an image is integrated on the sensor 20. The average contrast of a central region 66 of the image is used to determine how well the image is focused. The portion of the image surrounding a central focusing area 66 is rapidly read out and discarded, using "fast flush" clocking where the vertical and horizontal registers are continuously clocked and lines of image charge are dumped to the substrate through the fast dump structure 62. In the central focusing area 66, a pattern of lines are eliminated through the fast dump structure 62, and the intervening lines are transferred out to generate a focus adjustment signal. The process is repeated numerous times as the lens focus is adjusted until the maximum average contrast is obtained. At this point, the entire sensor is cleared using "fast flush" clocking, and the final image is then captured and read out.

19 Claims, 10 Drawing Sheets

CCD LINES

| | | | | | | | |
|---|---|---|---|---|---|---|---|
| LINE 1 | G | R | G | R | G | R | G | R |
| LINE 2 | B | G | B | G | B | G | B | G |
| LINE 3 | G | R | G | R | G | R | G | R |
| LINE 4 | B | G | B | G | B | G | B | G |
| LINE 5 | G | R | G | R | G | R | G | R |
| LINE 6 | B | G | B | G | B | G | B | G |
| LINE 7 | G | R | G | R | G | R | G | R |
| LINE 8 | B | G | B | G | B | G | B | G |

CCD LINES

| Line | | | | | | | | |
|---|---|---|---|---|---|---|---|---|
| LINE 1 | G | R | G | R | G | R | G | R |
| LINE 2 | B | G | B | G | B | G | B | G |

LINE 3
LINE 4
LINE 5          ELIMINATED VIA
LINE 6          "FAST DUMP"
LINE 7
LINE 8

| LINE 9 | G | R | G | R | G | R | G | R |
|---|---|---|---|---|---|---|---|---|
| LINE 10 | B | G | B | G | B | G | B | G |

LINE 11
LINE 12
LINE 13         ELIMINATED VIA
LINE 14         "FAST DUMP"
LINE 15
LINE 16

ELECTRONIC CAMERA WITH RAPID AUTOMATIC FOCUS OF AN IMAGE UPON A PROGRESSIVE SCAN IMAGE SENSOR

FIELD OF THE INVENTION

The invention pertains to apparatus for automatically focusing an image upon an electronic image sensor and, more particularly, for rapidly focusing an image upon a progressive scan image sensor based upon signals from a partial area of the sensor.

BACKGROUND OF THE INVENTION

An image sensor for an electronic camera ordinarily contains a two-dimensional array of light sensitive photosites. In an interline transfer sensor, the image charge is transferred from the photosites to light-protected vertical registers, through which the image charge is moved to a horizontal readout register. On the other hand, in a full frame image sensor the image charge is incremented line-by-line through the photosites themselves to a horizontal readout register, from which the image signal is obtained. Since the full frame image sensor does not contain a separate light-protected storage area, a shutter is normally used to block the light and prevent vertical smearing when reading out the image.

An example of an electronic still camera is the model DCS 200c camera, marketed by Eastman Kodak Company, Rochester, N.Y. This camera uses a high resolution full frame image sensor in an electronic camera back which attaches to a conventional 35 mm film camera body. The camera body includes a normal focal plane shutter for blocking image light. In this type of electronic camera, a separate focus sensor is used in the camera body to automatically focus the camera lens. This extra sensor increases the camera cost. It may also result in a less than optimally focused image on the sensor, if the tolerances of the camera lens focusing mechanism, and the tolerances of the focus detector, are not tightly controlled. Therefore, by using the high resolution image sensor itself to focus the camera lens, the camera cost may be reduced, and the camera focusing accuracy may be increased.

Focusing a camera lens by using the sensor output signal is an iterative process which requires capturing a sequence of images while varying the focus, until a focus-related parameter of the image, such as the "average contrast", is maximized. Prior art camcorders typically use NTSC format interline image sensors, which do not require a mechanical shutter, to perform this type of automatic lens focusing. In these camcorders, the same image that is recorded is also analyzed to provide the focus information. Focusing is done by spatially bandpass filtering a subsection of the video image read out from the sensor. The lens focus position is adjusted to obtain the highest average magnitude output signal (highest average contrast) from the bandpass filter. Note that the camcorder's image sensor is ordinarily read out at the video field rate (1/60 second) so that the same sensor operating mode is used to provide both the focus information and the final images. In such camcorders, many images may need to be read out before the lens is properly focused. Since the image readout time is relatively rapid (approximately 1/60 second), acceptable focus can typically be achieved in less than a second.

Focus time can be further improved by application of the technique shown in U.S. Pat. No. 5,051,833 (Tsuji). This patent describes an electronic still camera in which focus is based on a rectangular subset of the pixels on an interline charge coupled device (CCD) sensor. During the focusing operation, the image lines within the rectangle are read out at the regular NTSC video rates, while the lines outside the rectangle are read out more rapidly to a charge drain on the CCD sensor. Tsuji thus describes a focusing mode which takes less time for reading out an image for the purpose of focusing than is taken for reading out an image for normal image capture. This focusing mode is employed with an interline transfer sensor, which has light-protected storage areas (vertical registers) and consequently does not require a mechanical shutter. Because the focusing image frames are not usable as captured images, this technique is not useful with camcorders. Moreover, focusing time can remain a problem if rapid utilization of the camera is desired or if longer readout times are required, such as for definitions higher than NTSC resolution.

Progressive scan image sensors having a noninterlaced architecture, such as the Kodak model KAI-0310CM imager, have been developed for high quality color electronic cameras. This sensor has approximately 480 active lines, and approximately 640 active pixels per line. A progressive scan sensor provides a higher quality still image than an interlaced sensor, since all lines are captured during the same interval of time. Unlike an interlace sensor, the progressive scan sensor allows the entire image to be read out in a single scan, albeit through light protected vertical registers as in the interline sensor. Mechanical shuttering, therefore, is unnecessary for exposure control (and to prevent vertical smear) as the function can be performed electronically.

For a high quality still mode, the progressive scan sensor can be read out at slower than video rates without sacrificing performance, since real-time operation is not required. If, however, the image is read out in the same period of time as from an interlaced image sensor, readout timing from a progressive scan image sensor normally requires a clock rate of approximately twice that used with the interlaced image sensor. Such timing would be required, for instance, for an electronic viewfinder or for the rapid acquisition of image data, such as for autofocus determination. For example, an NTSC format interlaced image sensor with 480 lines and 640 pixels per line requires a clock rate of approximately 12 MHz to read out the 640 lines in the 52.4 mSec NTSC standard active line time, which provides a field rate of 1/60 second. Since a progressive scan sensor, like the model KAI-310 imager, must read out twice as many lines per field, it must use a clock rate of about 24 mHz to read out all 480 lines in 1/60 second. This higher clock rate requires more expensive clock drivers, analog processing, and A/D conversion than interlaced sensors require. Such high speed, and thus high cost, components are required for autofocus processing within the focusing area even though, as in Tsuji, the lines above and below the focusing area are not used.

This leads to the anomalous situation that a non-imaging part of the system, the autofocus processing, requires the higher clock rate, and thus the higher cost parts—clock drivers, analog processing, A/D converters, etc.—than the high resolution imaging part itself. What is needed is a technique for reading out the image sensor data within the focusing area in a manner that decreases the required clock rate while enabling rapid focus of the lens of an electronic camera.

SUMMARY OF THE INVENTION

In arriving at the invention, it was first realized that quick dumping of some parts of the image, even within the focusing area itself, could solve the clocking problem and still leave enough information in the remaining part of the focusing area that the remaining lines of the image could be used for focus evaluation. The problems noted above are then solved according to the invention by basing focus evaluation on a subset of the image lines within the focusing area of the image. More particularly, an electronic camera having an automatically focused lens that is operable to focus an image based on image data electronically obtained by the camera from a partial area of the whole image includes an image sensor comprising a two-dimensional array of photosites arranged in lines and columns to provide image charge, the sensor having the capacity to eliminate some lines of image charge and to transfer other lines of image charge. The camera further includes a timing and control section for controlling the sensor so as to eliminate a pattern of lines of image charge from the partial area utilized for autofocus and to transfer the intervening lines of image charge within the partial area, and a processor for generating a focus adjustment signal based on the intervening lines of image charge transferred from the partial area.

Unlike the application of conventional camcorder automatic focusing techniques to interline sensors, which would take several seconds with a progressive scan architecture to bring the lens into focus, the advantage of the invention is that the entire focusing sequence occurs rapidly, taking only a fraction of a second. Furthermore, high speed requirements are avoided by dropping lines of image charge within the partial area that is used for autofocus evaluation.

BRIEF DESCRIPTION OF THE DRAWINGS

The invention will be described in relation to the drawings, wherein.

DETAILED DESCRIPTION OF A PREFERRED EMBODIMENT

Figure 1:
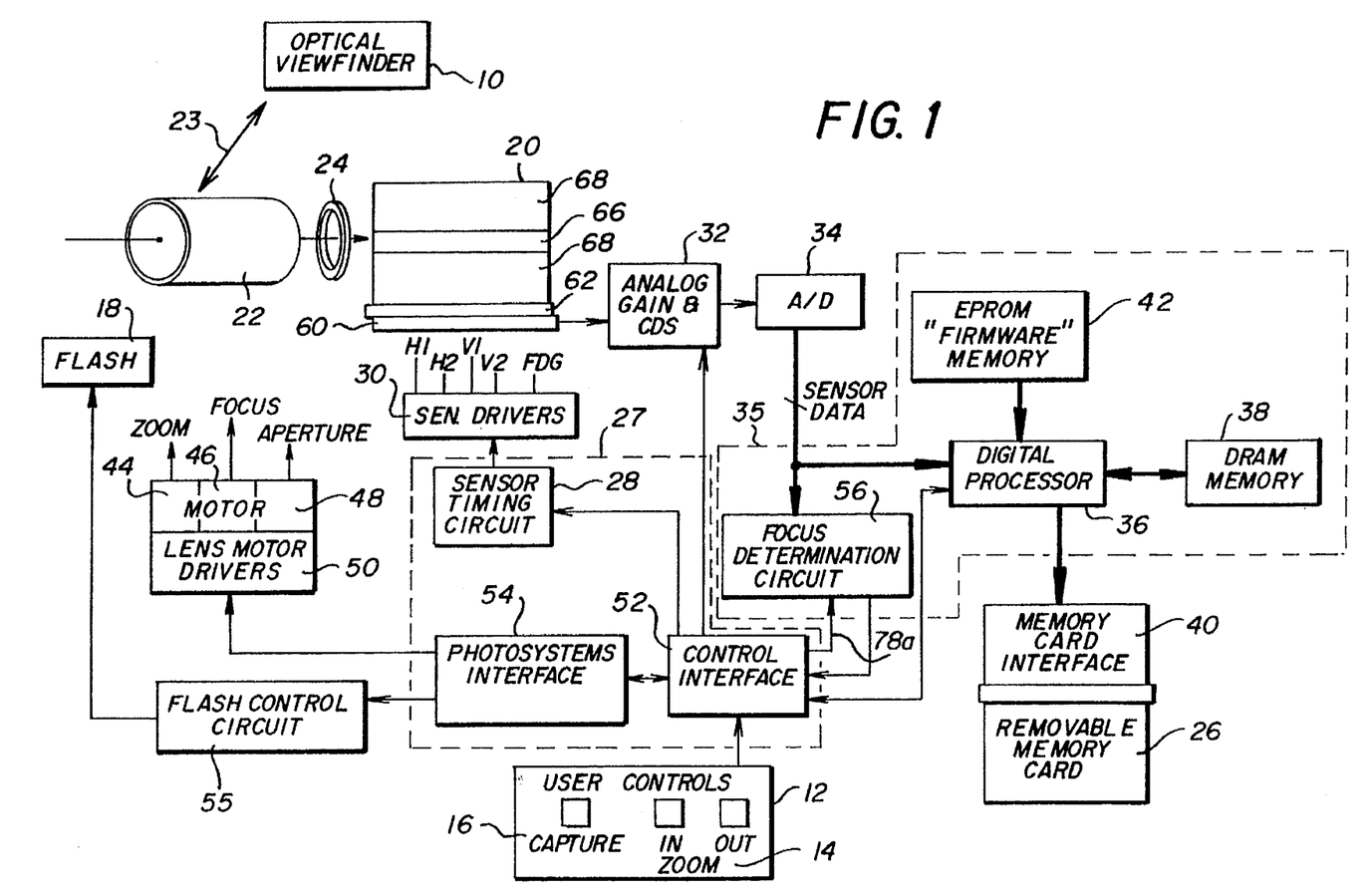
FIG. 1 is a block diagram of an electronic camera incorporating the invention in connection with a progressive scan image sensor.

A block diagram of a camera using an automatic focus apparatus incorporated into a progressive scan architecture according to the invention is shown in FIG. 1. The camera includes an optical viewfinder 10 and a user control section 12 having a number of user control buttons, including zoom buttons 14 and a capture button 16. To take a still picture, the user turns on the camera (using a power switch (not shown), which may be automatically enabled when the user depresses the zoom buttons 14 or partially depresses the capture button 16). The user composes the picture by depressing the "zoom in" or "zoom out" buttons 14, and by adjusting the position of the camera, while observing the viewfinder image. When the user is satisfied with the composition, the user depresses the capture button 16. The camera then captures a single still image, firing a flash 18 if necessary when the ambient illumination level is low. The still image is focused upon an image sensor 20 by a motor driven zoom lens 22, which is interconnected with the viewfinder 10 by a mechanical coupling 23. The intensity of the image light upon the sensor 20 is regulated by a motor driven mechanical aperture 24 while exposure time is regulated electronically by appropriate clocking of the sensor 20. The still image from the image sensor 20 is processed and digitally stored on a removable memory card 26.

Control of the sensor 20 is provided by a timing and control section 27, which specifically includes a sensor timing circuit 28. The sensor timing circuit 28 provides the signals to enable sensor drivers 30, which provides horizontal clocks (H1, H2) and vertical clocks (V1, V2), as well as a signal FDG for activating a drain structure on the sensor 20. The output of the image sensor 20 is amplified and processed in an analog gain and sampling (correlated double sampling (CDS)) circuit 32, and converted to digital form in A/D converter 34. The A/D output signal is provided to a processor section 35, which includes a digital processor 36 which temporarily stores the still images in a DRAM memory 38. The digital processor 36 then perform image processing on the still images, and finally stores the processed images on the removable memory card 26 via a memory card interface circuit 40, which may use the PCM-CIA 2.0 standard interface. An EPROM memory 42 is used to store the firmware which operates the digital processor 36.

The motor driven zoom lens 22 includes a zoom motor 44, a focus motor 46, and an aperture motor 48 (all controlled by lens motor drivers 50). The timing and control section 27 further includes a control interface 52 connected to the lens motor drivers 50 and to a flash control circuit 55 via a photosystem interface block 54, which controls the operation of the zoom lens 22 and the flash 18. The lens zoom position is controlled by the photosystem interface block 54 based on the position input from the zoom control buttons 14. The focus is set by the control interface 52 using a focus adjustment signal output by a focus determination circuit 56 within the processor section 35. The focus determination circuit 56 processes data from the A/D converter 34 according to a focusing algorithm (which will be described in connection with FIG. 8) applied to a selected partial area of the image sensor 20 as the sensor is operated in the focus mode. An iterative algorithm in the control interface 52 adjusts the lens focus position, depending on the output of the focus determination circuit 56, until the focus determination process provides a maximum contrast signal. Although the digital processor 36 and the control interface 52 are shown as two separate blocks, in some implementations the same processor could be used to perform both of these functions. Other of the recited functions, such as focus determination, could also be functionally part of one of the processors.

Figure 2A:
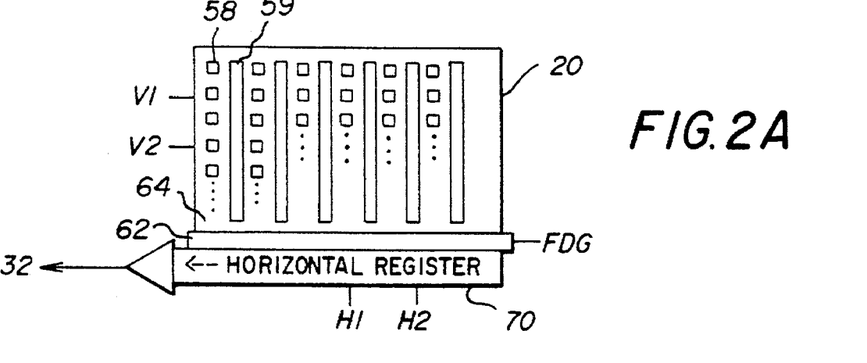
FIGS. 2A and 2B are diagrams of progressive scan image sensors useful with the camera of FIG. 1.
Figure 3:
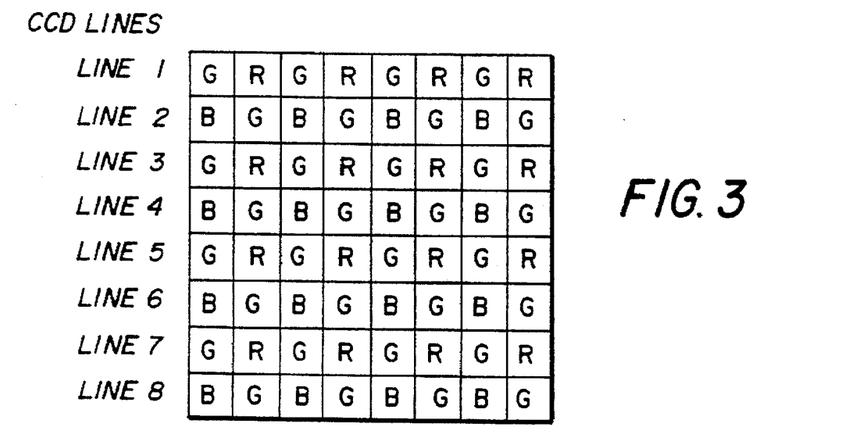
FIG. 3 is a diagram of the Bayer color filter geometry for the sensor used with the camera of FIG. 1.

The sensor 20 is a progressive scan interline image sensor having a noninterlaced architecture, as shown in more detail in FIG. 2A. The sensor comprises a two-dimensional array of photosites 58, e.g. photodiodes, arranged in rows (lines) and columns, a plurality of vertical registers 59 adjacent photosite columns for transferring rows (lines) of image charge from the photosites 58 to a horizontal register 60 for readout, and a charge drain (specifically, a fast dump structure 62) interposed between the output of the vertical registers 59 and the horizontal register 60 for eliminating complete rows (lines) of image charge at a time from the image sensor 20 by discharge to a sensor substrate 64. A preferred image sensor is the Kodak model KAI-0310CM CCD image sensor, which has approximately 480 active lines with approximately 640 active pixels per line and an image aspect ratio of 4:3. This sensor is described in a Performance Specification document available from Eastman Kodak Company, Rochester, N.Y. Each pixel is 9 microns "square", since both the vertical and horizontal distances between the centers of adjacent pixels are 9 microns. The sensor uses a color filter array pattern known as the "Bayer checkerboard" pattern, described in U.S. Pat. No. 3,971,065, which is shown in FIG. 3. Such a color filter array is characterized by a mosaic pattern in which the filter colors alternate in both line and column directions.

The sensor 20 uses a progressive scan readout method, which allows the entire image to be read out in a single scan. In this operating mode, all of the pixels on the sensor are transferred to the horizontal register 60, which delivers the image signals to the analog gain and CDS circuit 32 (see FIG. 1). More specifically, referring to FIG. 2A, the accumulated or integrated charge for the photodiodes comprising the photosites 58 is transported from the photosites to light protected vertical (parallel) registers 59 by applying a large positive voltage to the phase-one vertical clock (V1). This reads out every row, or line, into the vertical registers 59. The charge is then transported from the vertical registers 59 to the horizontal register 60 by two-phase clocking of the vertical clocks (V1, V2). Between the vertical and horizontal registers is the fast dump structure 62, which is further described in the Performance Specification document for the KAI-310 sensor. By setting a suitable positive potential on a fast dump gate line FDG, charge from the row (line) of pixel values currently adjacent to the fast dump structure 62 is transferred from the CCD channel directly into the sensor substrate 64 rather than to the horizontal register 60. This dump, or line clear, is accomplished during the vertical-to-horizontal transfer time. When properly controlled by the sensor timing circuit 28, the fast dump structure 62 allows lines of charge to be eliminated. (A conventional use of the gate 62 is to eliminate stray charge in the vertical registers 59 during especially long integration times, and just before transfer of image charge to the vertical registers 59. The gate 62 may also be used to eliminate unwanted non-image lines above and below the 20 image.)

Figure 4:
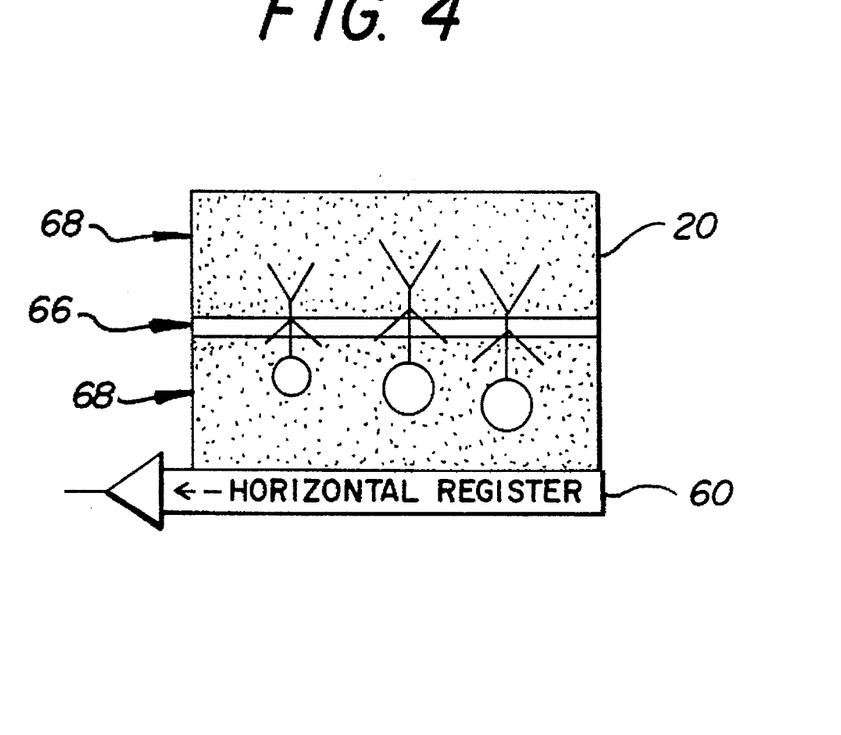
FIG. 4 is a diagram of the imaging portion of a sensor showing a central focusing area.

FIG. 4 shows a representative portion of the image sensor 20 which provides the data used to focus the image in the focusing operating mode. Only a small number of lines in a central focusing area 66 of the image are used to provide the focus determination input data. For the progressive scan sensor, the other lines in the outer area 68 are quickly read from the image by continuously holding the fast dump structure 62 at a high positive potential, as the vertical clocks are cycled high and low to transfer lines of charge to the substrate via the fast dump drain. Since the image charge for the non-used lines are quickly flushed from the sensor, this operation is referred to as a "fast flush" and the focus mode is thus described as a fast flush focus mode. The time required to read out the image in the fast flush focus mode is well under 10 mSec. Although it may take 10 iterative cycles for proper focus in some cases, acceptable focus can still be achieved in a fraction of a second. Moreover, as will be described, dropping lines within the central focusing area 66 allows even more "images" to be captured per unit time (i.e., more iterative cycles or image "updates"). If more image updates can be obtained in a given period of time, then autofocus can be achieved more rapidly for the same size central focusing area 66 as would be used in the prior art. Alternatively, if the existing update rate is satisfactory, the central focusing area 66 can be enlarged in the vertical direction without decreasing the update rate obtained in the prior art. A larger central focusing area 66 may be useful in focusing on a more appropriate area of the sensor 20.

The timing and control section 27 operates the electronic camera shown in FIG. 1 in two modes, including a first imaging mode wherein all rows of signal charge corresponding to each line are progressively read out through the horizontal register 60 during a single scan, and a second autofocus mode wherein some of the rows of signal charge corresponding to some lines are eliminated through the fast dump structure 62 prior to readout. As applied to the embodiment of FIG. 1, the first mode corresponds to a high quality still imaging mode while the second mode corresponds to a focusing mode for providing central lines of image data to the focus determination circuit 56. In the autofocus mode, the timing and control section 27 controls the fast dump structure 62 to A) eliminate all lines of image charge in the outer area 68 (FIG. 4) outside the central focusing area 66, and B) eliminate at least one line of image charge from the image sensor 20 for every one or more lines of image charge that are transferred to the horizontal register 60 for readout from the central focusing area 66.

Figure 6:
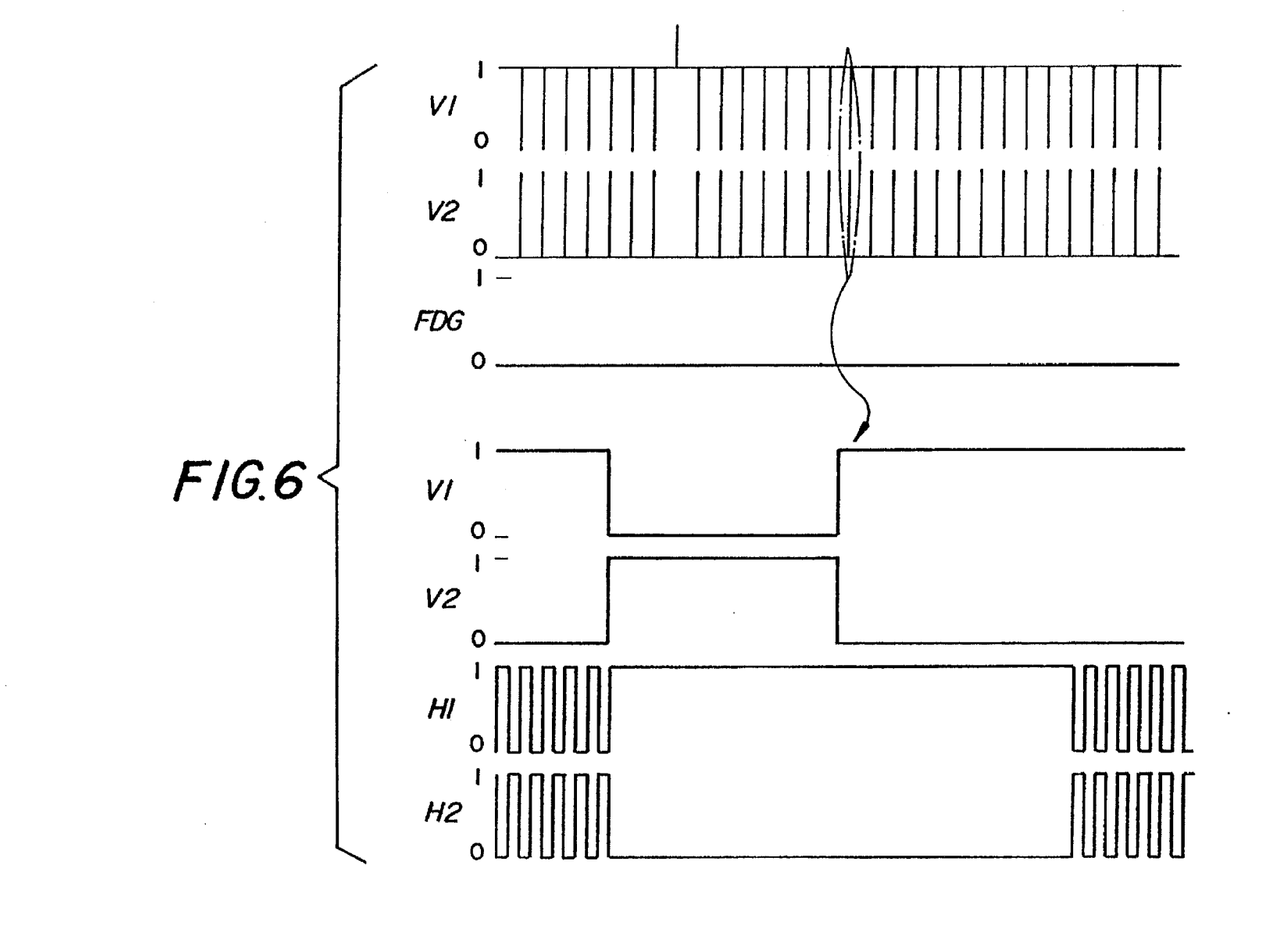
FIG. 6 shows the line timing for the still imaging mode of operation.
Figure 7A:
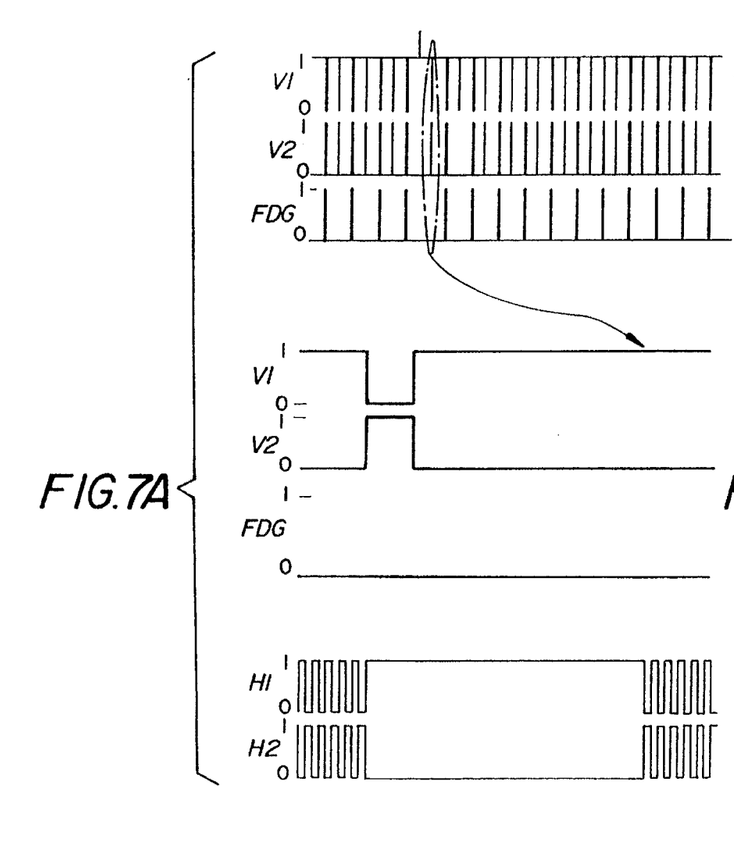
FIGS. 7A and 7B show the line timing for the autofocus mode of operation.
Figure 7B:
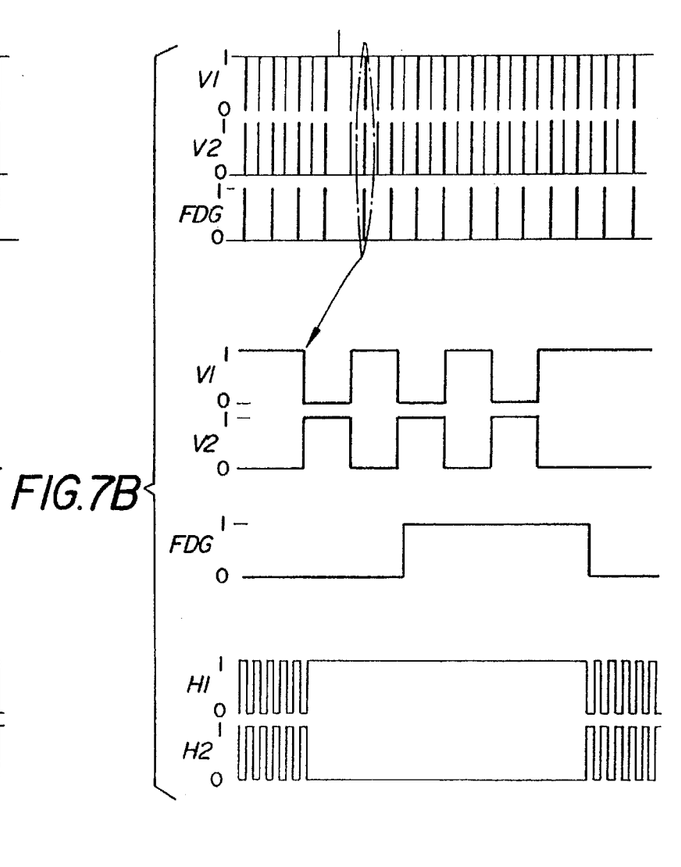

The sensor timing circuit 28 is controlled by the control interface 52 to provide the clock signals V1, V2, H1, H2, and the gate signal FDG according to the two modes of operation. The timing signals for the first mode are shown in FIG. 6; those for the second mode are shown in FIGS. 7A and 7B. The two-phase cycling of signals V1 and V2 control the transfer of lines of image charge from the vertical registers 59 to the horizontal register 60. The two-phase cycling of signals H1 and H2 control the transfer of pixels from the horizontal register 60 to subsequent circuits in the camera. The level of the signal FDG determines whether the image charge is dumped to the substrate 64 or transferred to the horizontal register 60. When the sensor 20 is clocked using the first timing mode shown in FIG. 6, all lines of the sensor are clocked out, one after the other, through the horizontal register 60, processed in subsequent camera circuitry, and stored in the removable memory 26. This timing mode provides a high quality progressive scan still image, but may take 1/30 second or longer to read out the still image. Such timing, however, is acceptable for still mode usage, and, as mentioned before, does not require unusually high speed components.

Figure 10:
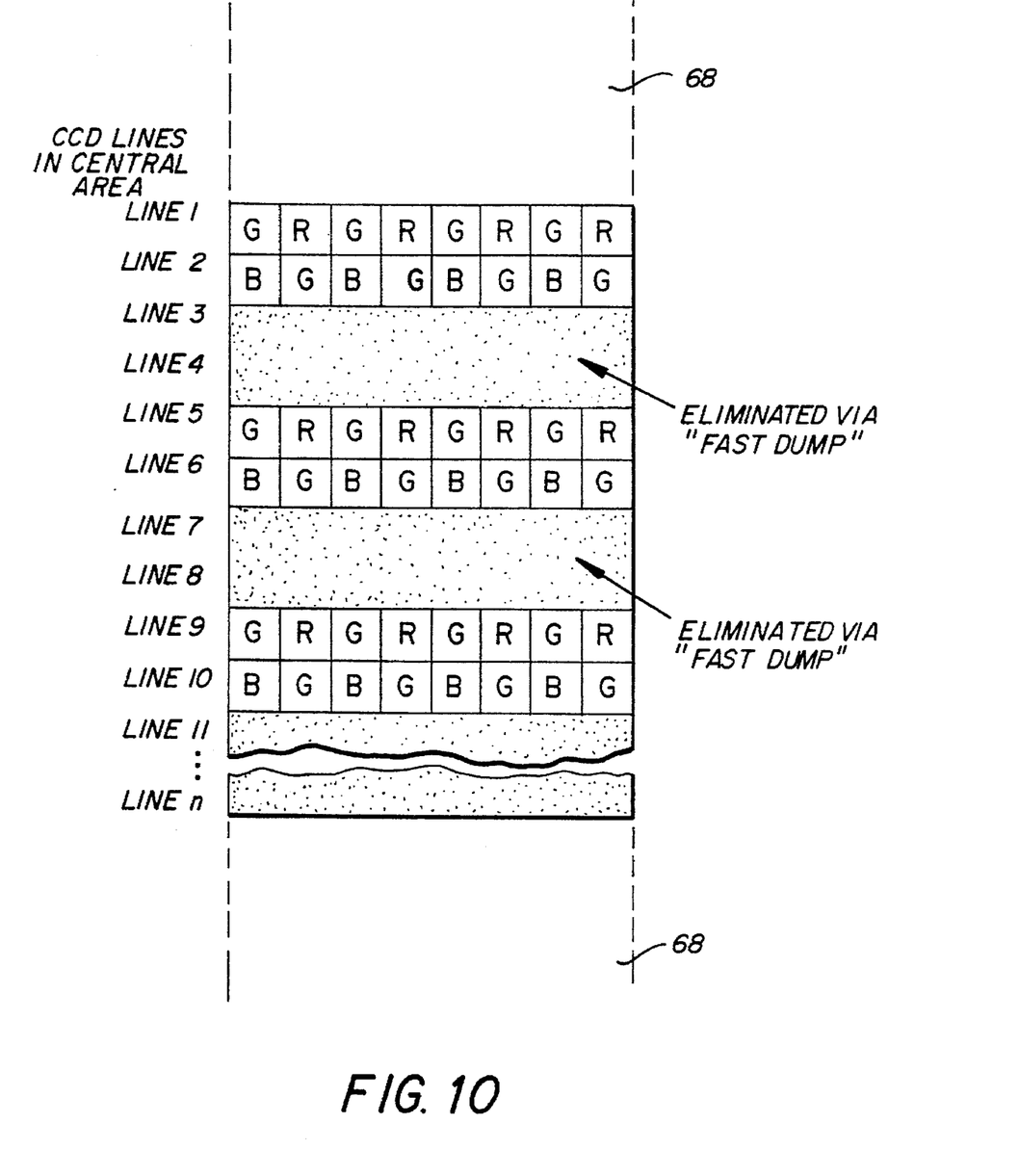
FIG. 10 shows a first embodiment of a line-skipping pattern, especially for the central focusing area shown in FIG. 4.

To provide focusing data to the focus determination circuit 56, a lower resolution image was found to be suitable. The update rate must be sufficient to provide good focus detection. An update rate of 60 fields/sec is appropriate. Moreover, the sensor 20 includes the aforementioned array of color filters arranged in a particular color pattern (e.g., the checkerboard Bayer pattern of FIG. 3), and the lines of image charge that are transferred to the horizontal register 60 should preserve that particular color pattern in the pattern of lines that are generated, if only for ease of subsequent processing. To provide this kind of focusing image, a pattern of lines in the central focusing area 66 of the sensor 20 is eliminated in the autofocus mode, and the intervening lines are transferred to the horizontal register 60, using the timing shown in FIG. 7B. The line-skipping pattern for the central focusing area 66 is shown in FIG. 10. The first two lines (1 and 2) are read out as in the imaging mode. These provide a green-red and a blue-green line. The next two lines (3 and 4)a are eliminated by turning on the fast dump structure 62 during the time that these lines are transferred past the fast dump structure 62. Next, lines 5 and 6 are read out normally, and then lines 7 and 8 are eliminated through the fast dump structure 62. This process proceeds through the central area 66 and generates an output image signal having the Bayer-type color filter repeating pattern, so that the signals can be processed using algorithms designed for the Bayer pattern. More specifically as to waveforms, in the area 68 surrounding the central focusing area 66, the vertical clocks are cycled continuously with the fast dump gate FDG held high. This dumps all lines of image charge for the outer area 68 into the sensor substrate 64. FIGS. 7A and 7B shows the clock waveforms for the vertical and horizontal clocks V1, V2, H1, H2 and the fast dump gate FDG for the central focusing area 66. For each saved pair of lines (i.e., lines 1 and 2, 5 and 6, etc.) that is read out as in the imaging mode, another pair of lines (i.e., lines 3 and 4, 7 and 8, etc.) is eliminated by turning on the fast dump structure 62 during the time that this line pair is transferred past the fast dump structure 62. The first line of each saved pair is transferred to the horizontal register 60 and read out according to the timing diagram shown in FIG. 7A. The second line of each saved pair is transferred to the horizontal register 60, and the succeeding pair of two lines are dumped through the fast dump structure 62, according to the timing diagram shown in FIG. 7B. The continuation of the sequence of this readout timing achieves readout of the central focusing area 66. This results in a line-skipping sequence of dumping alternate line pairs, and saving intervening line pairs.

Figure 11:
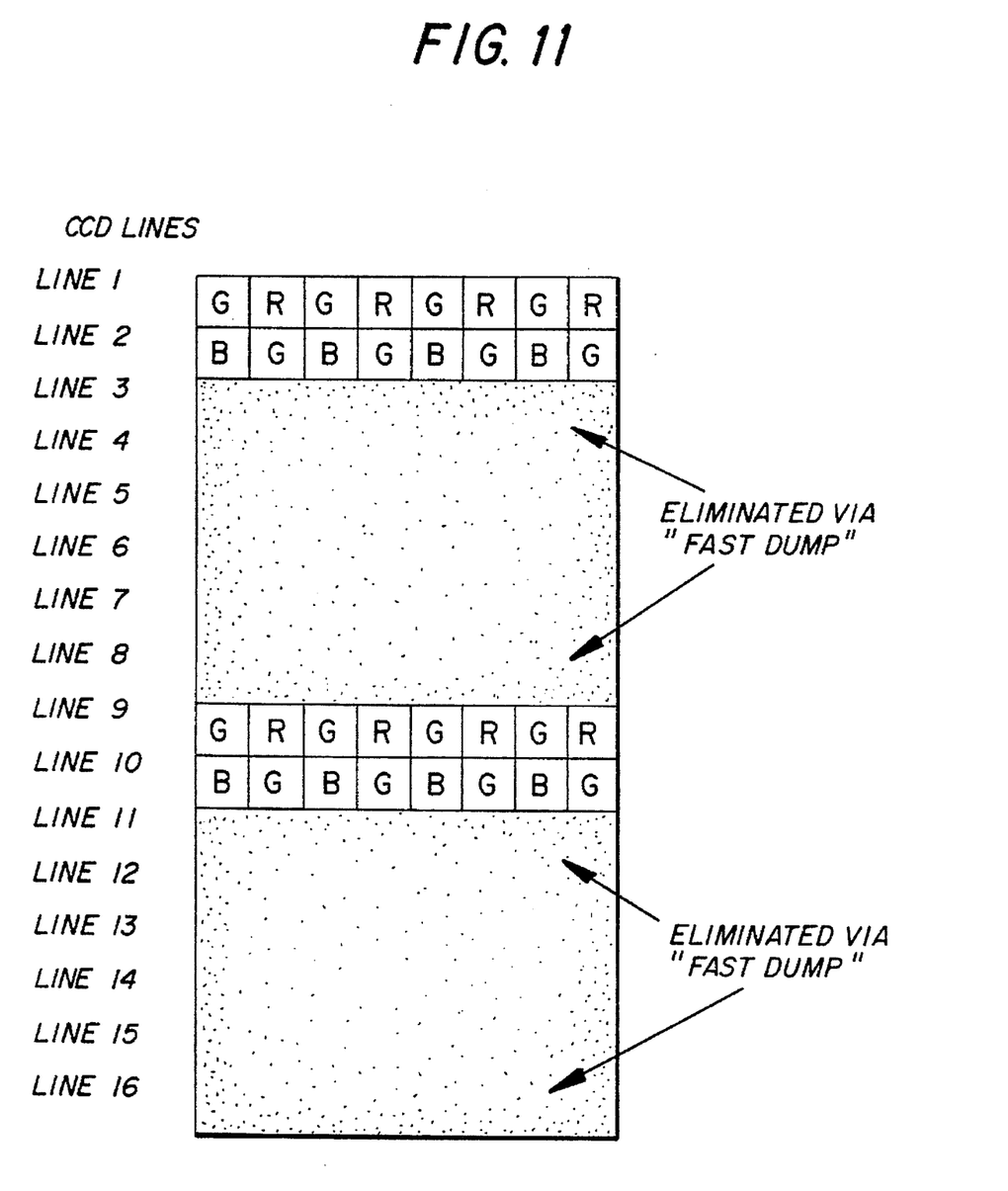
FIG. 11 shows a second embodiment of a line-skipping pattern for the central focusing area.
Figure 12A:
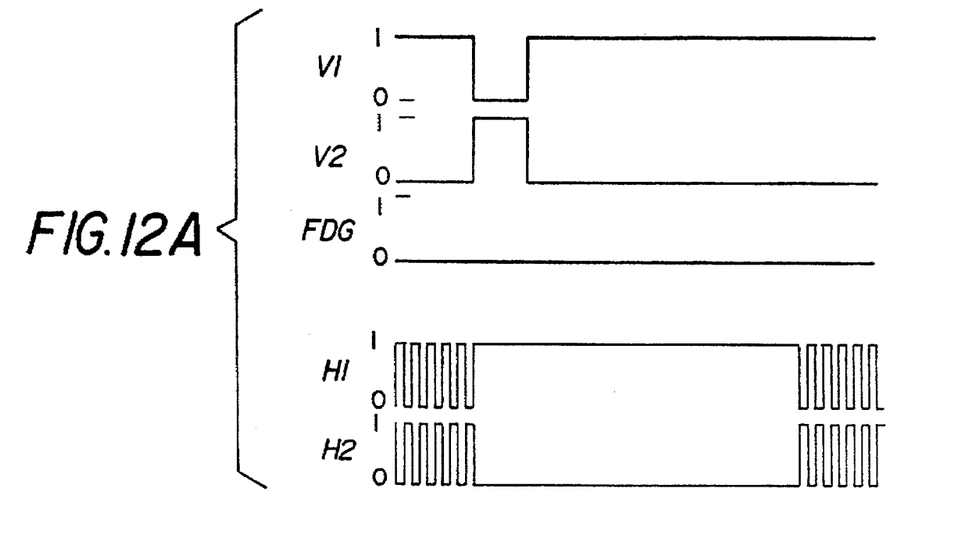
FIGS. 12A and 12B shows the line timing for the pattern shown in FIG. 11.
Figure 12B:
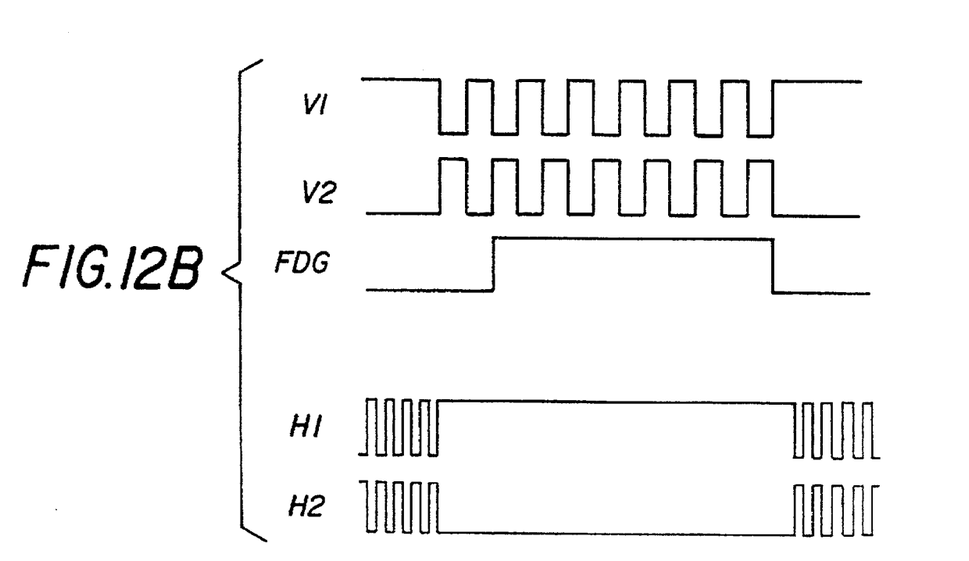

A second embodiment of line skipping in the central area 66 is shown in FIG. 11. Basically, six lines are dumped for each two lines that are read out, thus preserving the Bayer-type pattern in the readout signal while gaining further advantage in processing time. To provide this kind of focusing image, the area 68 outside the central area 66 continues to be read out by continuously cycling the vertical clocks with the fast dump gate FDG held high. Within the central area 66, the timing is shown in the waveforms of FIGS. 12A and 12B. The first two lines (1 and 2) are read out as in the imaging mode. These provide a green-red and a blue-green line. The next six lines (3-8) are eliminated by turning on the fast dump structure 62 during the time that these are transferred past the fast dump structure 62—and so on in sequence (save two lines, dump six lines, save two, dump six, etc.) with 20 the remainder of the lines. As was explained in relation to FIGS. 7A and 7B, the first line of each saved pair is transferred according to the timing of FIG. 12A, and the second line of each saved pair, as well as the six lines that are dumped, are processed according to the timing of FIG. 12B.

Although the color filter array pattern has been preserved by saving pairs of lines, and then dumping integral numbers of pairs of lines, the pattern may also be preserved by saving single lines and dumping an appropriate number of lines, e.g., save one line and dump seven lines. Moreover, the invention should not be considered limited to a specific color filter array pattern or to any particular line-skipping sequence. Indeed, it is not strictly necessary to preserve the color filter array pattern in order to obtain image data useful for autofocus determination. Nor must lines be dumped in pairs, or in multiples of pairs. The advantage of the invention as broadly understood, namely to reduce the amount of data that must be handled from the central focusing area 66, can be obtained by dumping any number or pattern of lines irrespective of the color filter array geometry.

Figure 5:
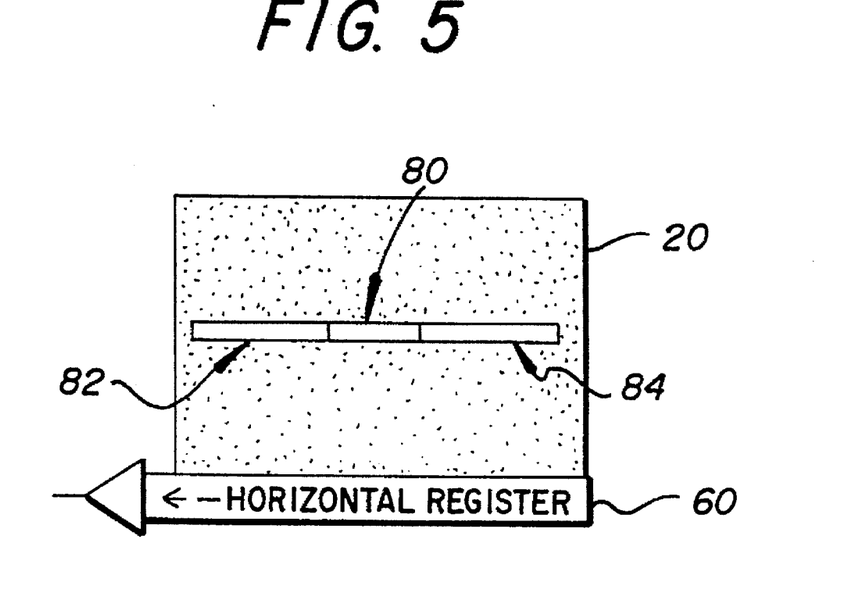
FIG. 5 is a diagram of the imaging portion of a sensor showing a central focusing area divided into regions.
Figure 8:
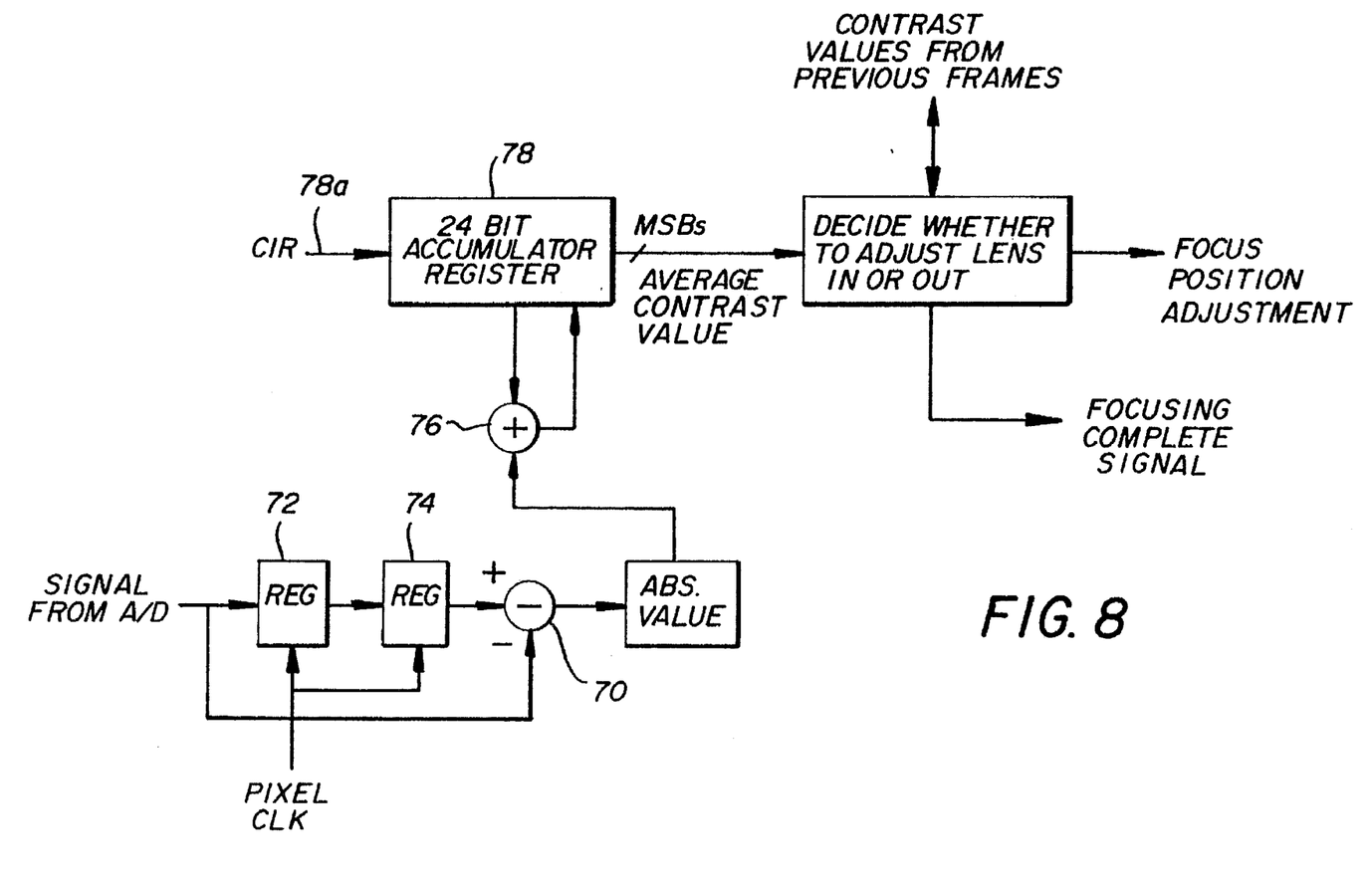
FIG. 8 is a block diagram of a focus determination circuit used in the camera of FIG. 1.

FIG. 8 shows the focus determination circuit. This circuit measures the "average contrast" (high frequency detail) of a portion of the image. The high frequency detail is obtained by a subtractor 70, which subtracts the value of the current input pixel output by the A/D converter 34 from the value of the A/D output delayed by two pixels, via two registers 72 and 74. The two register delay is used instead of a single register, since the horizontal color filter pattern along the line repeats every two pixels. This ensures that similarly colored pixels are subtracted. The output of the subtractor is zero when the values of the two pixels are identical. The magnitude of the subtractor output increases as the difference between pixel values increases. This subtractor output will be large near vertically oriented edges if the camera lens is well focused, but smaller near these same edges if the camera lens is not well focused. The absolute value of the subtractor output is combined in a summer 76 with an accumulated value from an accumulator register 78. This accumulated value is the average contrast value. A single average contrast value may be computed, for example, for the central area 66 shown in FIG. 4. In this instance, an accumulator clock input 78a (provided by the control interface processor 52) would be enabled for all pixels in the central area 66 shown in FIG. 4, and disabled for any pixels outside this area. In any event, the accumulated average contrast value is the focus adjustment signal that is used by the control interface 52 and the photosystems interface 54 in the adjustment of the lens 22. Alternately, the circuit in FIG. 8 could be modified to include multiple accumulators to store the average contrast for multiple regions in the image. For example, the average contrast could be computed for a center region 80, a left central region 82 and the right central region 84 as shown in FIG. 5.

Figure 9:
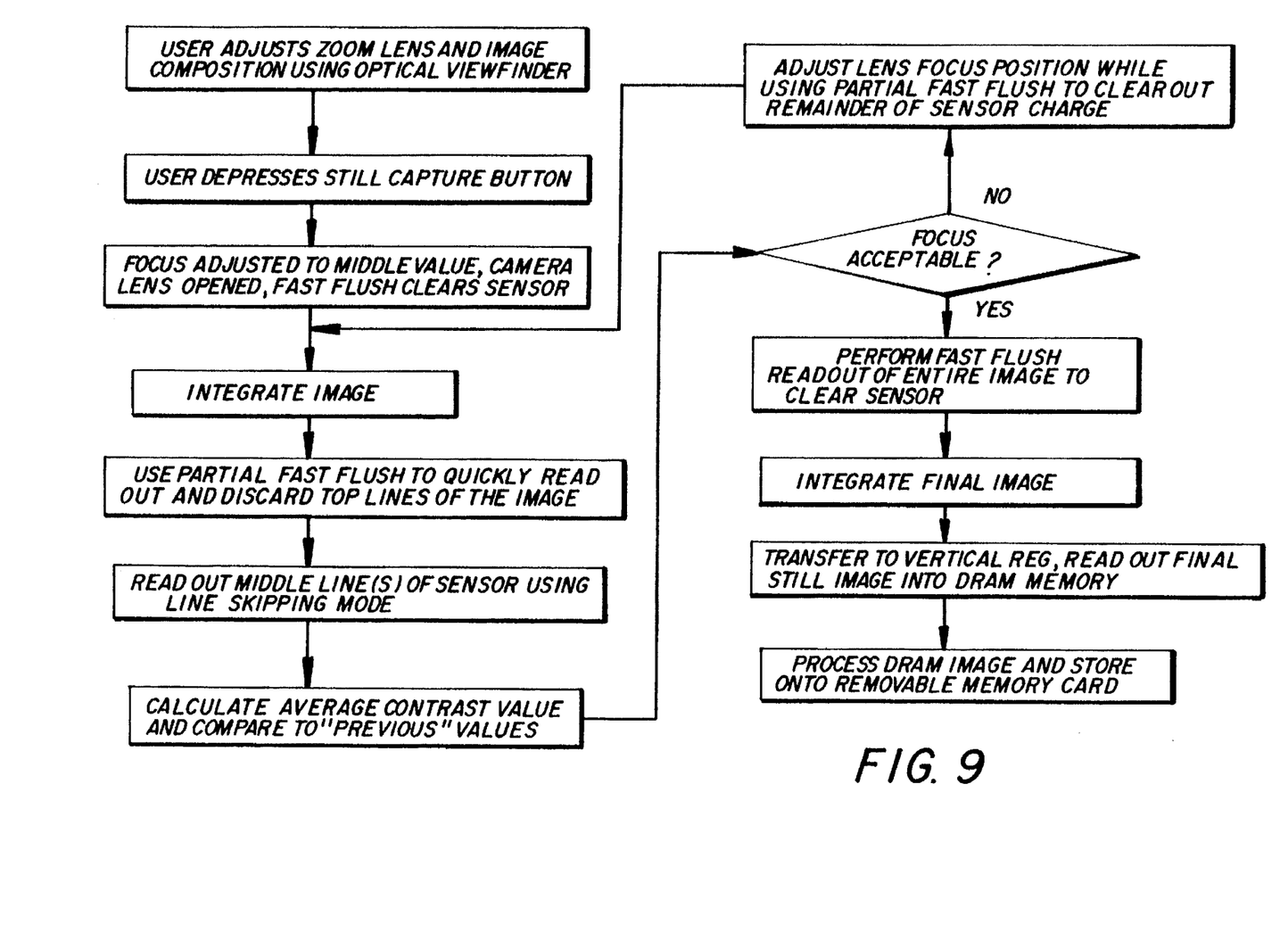
FIG. 9 is a flowchart showing the sequence of operations of the camera of FIG. 1.

FIG. 9 shows the operating sequence of the camera. The user adjusts the zoom setting and points the camera to compose the image, and then presses the still capture button 16. The camera focus is adjusted to a mid-range position, and the sensor 20 is cleared of any charge using the fast dump structure 62 for all lines on the entire sensor. An image, to be used for focusing the camera lens, is then integrated for a period of time, for example 10 mSec, during the focusing mode. During this mode, a top portion of the image is rapidly read out and discarded, using "fast flush" clocking where the vertical and horizontal registers are continuously clocked and the fast dump gate FDG remains high. The vertical clock sequence is then set to a line skipping operation (e.g., read two lines, dump two lines, read two, dump two, etc.), while the small number of remaining (not dumped) lines in the central area 66 of the image are clocked out. The average absolute value output (average contrast) of a horizontal spatial bandpass filter processing these image lines is used to determine how well the image is focused. This average contrast value is stored by the control interface 52, and the lens focus is adjusted while the remainder of the image charge is cleared out using fast flush timing. The process of integrating and reading out the focus image is then repeated for a second focusing cycle. If the average contrast increases, the lens focus position is stepped again in the same direction. If the average contrast decreases, the focus position is moved in the opposite direction. These focusing cycles are repeated numerous times as the lens focus is adjusted until it provides the maximum average contrast. The entire focusing sequence occurs rapidly, taking only a fraction of a second. Once the average contrast has reached a maximum value, the focus is acceptable. At this point, the entire sensor 20 is cleared, using the fast dump structure 62. The final image is then integrated for a period of time and then transferred to the vertical registers 59, which terminates the exposure. The final image is finally read out from the horizontal register 60.

Figure 2B:
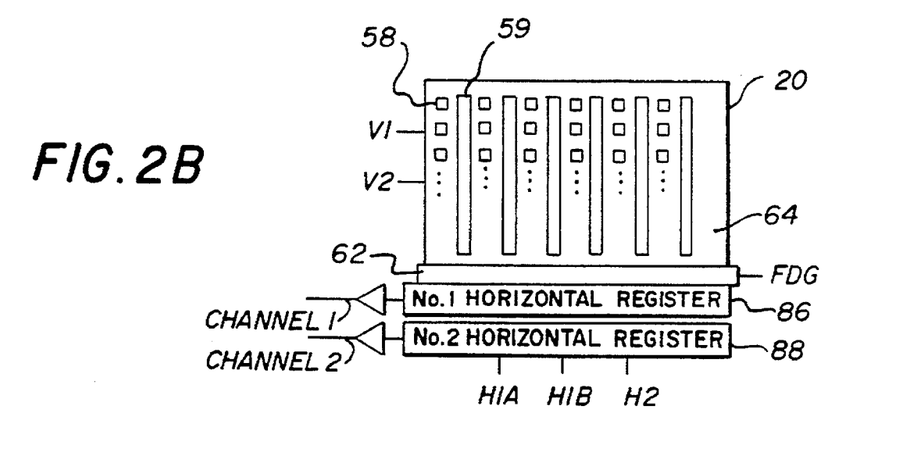

The invention has been described with reference to a preferred embodiment. However, it will be appreciated that variations and modifications can be effected by a person of ordinary skill in the art without departing from the scope of the invention. For instance, FIG. 2B shows a progressive scan sensor with two readout registers 86 and 88 (which corresponds to the Performance Specification document for the KAI-0310CM image sensor; the preferred embodiment of FIG. 2A simply uses but one register). The purpose is to double the system speed by having two complete processing channels (analog processing, A/D, etc.); the fast dump structure 62 of such a sensor would be operated as described in connection with foregoing figures to eliminate lines of charge in the central focusing area 66. Furthermore, although the Bayer pattern was described, other mosaic-type filter patterns could be used to advantage, for example, complementary patterns involving cyan, magenta, and yellow filters. While the preferred embodiment maintains the Bayer (mosaic) geometry for the benefit of subsequent algorithms, this is not strictly necessary. The line-skipping focusing mode could alternate between saved and dumped lines of charge, with the subsequent processing being accordingly adapted to the particular color progression that is output.

PARTS LIST 10 optical viewfinder
12 control section
14 zoom buttons
16 capture button
18 flash
20 image sensor
22 zoom lens
23 mechanical coupling
24 mechanical aperture
26 memory card
27 timing and control section
28 sensor timing circuit
30 sensor drivers
32 analog gain and CDS circuit
34 A/D converter
35 processor section
36 digital processor
38 DRAM memory
40 interface
42 EPROM memory
44 zoom motor
46 focus motor
48 variable aperture
50 lens motor drivers
52 control interface
54 photosystems interface
55 flash control circuit
56 focus determination circuit
58 photosites
59 vertical registers
60 horizontal register
62 fast dump structure
64 sensor substrate
66 central focusing area
68 outer area
70 subtractor
72, 74 registers
76 summer
78 accumulator register
80 center region
82 left central region
84 right central region
86 first readout register
88 second readout register

We claim:

1. An electronic camera having an automatically focused lens that is operable to focus an image based on image data electronically obtained by the camera from a partial area of the whole image, said camera comprising:

an image sensor comprising a two-dimensional array of photosites arranged in lines and columns to provide image charge, the sensor having the capacity to eliminate some lines of image charge and to transfer other lines of image charge;

a timing and control section for controlling the sensor so as to eliminate a pattern of lines of image charge from the partial area utilized for autofocus so as to leave an array of intervening lines, and to transfer the intervening lines of image charge within the partial area; and a processor for generating a focus adjustment signal based on the intervening lines of image charge transferred from the partial area.

2. An electronic camera as claimed in claim 1 wherein the timing and control section controls the image sensor so as to eliminate all lines of image charge from the remaining area outside the partial area.

3. An electronic camera as claimed in claim 1 wherein the timing and control section generates a pattern of eliminated lines within the partial area by eliminating two or more consecutive lines of image charge within the partial area for every two lines of image charge that are transferred from the partial area.

4. An electronic camera as claimed in claim 3 wherein two lines are eliminated for every two lines that are transferred.

5. An electronic camera as claimed in claim 3 wherein six lines are eliminated for every two lines that are transferred.

6. An electronic camera as claimed in claim 1 wherein the partial area is a central area of the whole image.

7. An electronic camera having an automatically focused lens, the lens operable to focus an image based on image data electronically obtained by the camera, the camera comprising:

an image sensor comprising a two-dimensional array of photosites arranged in lines and columns, a plurality of vertical registers adjacent photosite columns for transferring lines of image charge from the photosites to a horizontal register for readout as image data, and a charge drain interposed between the output of the vertical registers and the horizontal register for eliminating complete lines of image charge at a time from the image sensor;

a timing and control section for controlling the charge drain so as to eliminate at least one line of image charge from a central area of the image sensor for every one or more consecutive lines of image charge that are transferred from the central area to the horizontal register for readout, thereby generating a pattern of transferred lines suitable for focus determination; and a processor generating a focus adjustment signal based on the transferred lines from the central area.

8. An electronic camera as claimed in claim 7 wherein said timing and control section provides a pattern of lines within the central area by eliminating two or more consecutive lines of image charge for every two lines of image charge that are transferred to the horizontal register.

9. An electronic camera as claimed in claim 8 wherein two lines are eliminated for every two lines that are transferred.

10. An electronic camera as claimed in claim 8 wherein six lines are eliminated for every two lines that are transferred.

11. An electronic camera as claimed in claim 7 wherein the image sensor is a color sensor having an array of color filters arranged in a particular color pattern and wherein the lines of image charge that are transferred to the horizontal register preserve the particular color pattern in the pattern of lines that are generated for readout.

12. An electronic camera as claimed in claim 11 wherein the array of color filters is arranged in the following mosaic pattern of red, green, and blue filters

R G R G
G B G B
R G R G
G B G B and wherein the lines of image charge that are transferred to the horizontal register for readout preserve the same mosaic pattern.

13. An electronic camera having an automatically focused lens, the lens operable to focus an image data electronically obtained by the camera, the camera comprising:

a progressive scan image sensor capable of producing an entire image in a single scan in response to clocking signals, said image sensor comprising a two-dimensional array of photosites arranged in lines and columns, a plurality of vertical registers adjacent photosite columns for transferring lines of image charge from the photosites to a horizontal register for readout, and a fast dump structure interposed between the output of the vertical registers and the horizontal register for dumping complete lines of image charge at a time from the image sensor;

a timing and control section for producing clocking signals to read out the entire array of photosites in a single scan, said timing and control section further enabling the fast dump structure to dump at least one line of image charge from a central area of the image sensor utilized for autofocus for every one or more lines of image charge that are transferred from the central area to the horizontal register for readout, thereby generating a pattern of lines suitable for focus determination; and a processor for generating a focus adjustment signal based on the transferred lines from the central area.

14. An electronic camera as claimed in claim 13 wherein said timing and control section provides a pattern of lines within the central area, and wherein said camera is operable in two modes, including a first mode in which the entire array of photosites are read out in a single scan, and a second mode in which said pattern of lines is generated by dumping two or more consecutive lines of image charges through the fast dump structure for every two lines of image charge transferred to the horizontal register to provide the focus adjustment signal.

15. An electronic camera as claimed in claim 14 wherein two lines are eliminated for every two lines that are transferred.

16. An electronic camera as claimed in claim 14 wherein six lines are eliminated for every two lines that are transferred.

17. An electronic camera as claimed in claim 13 wherein the image sensor is a color sensor having an array of color filters arranged in a particular color pattern and wherein the lines transferred to the horizontal register to provide the focus adjustment signal comprise a pattern that replicates the particular color pattern of the array of color filters.

18. An electronic camera as claimed in claim 17 wherein the array of color filters is arranged in the following mosaic pattern of red, green, and blue filters

R G R G
G B G B
R G R G
G B G B and wherein the lines of image charge that are transferred to the horizontal register for readout preserve the same mosaic pattern.

19. An electronic camera having an automatically focused lens that images light upon an image sensor comprising a two-dimensional array of photosites arranged in lines and columns, the lens operable to focus an image based upon lines of image data integrated from a central area of the image sensor under control of a timing and control section, the improvement wherein the timing and control section generates an intermittent pattern of lines within the central area utilized for autofocus by dumping some lines and transferring other lines, the transferred lines being used in the focus of the lens.

* * * * *